Patented July 28, 1942

2,290,949

UNITED STATES PATENT OFFICE 2,290,949

PRODUCTION OF COLORED TEXTILE AND OTHER MATERIALS

Henry Dreyfus, London, England, assignor to Celanese Corporation of America, a corporation of Delaware No Drawing. Application October 28, 1938, Serial No. 237,469. In Great Britain November 20, 1937

18 Claims. (Cl. 106—165)

This invention relates to the production of colored cellulose ester or ether products, and particularly colored filaments, straws, foils or similar materials of these substances.

According to the present invention valuable colored cellulose ester or ether filaments, straws, foils and similar materials are produced by shaping into the required form and then setting a solution of a cellulose ester or ether, the said solution containing in suspension a sulphonated dye having little or no direct affinity for the cellulose ester or ether, and especially a dyestuff which is dischargeable. Particularly suitable for the purposes of the invention are substantive cotton dyes.

By this means colored products may be produced of which the color is of very good fastness to rubbing and to wet treatments such as soaping. It is surprising that as regards these properties the materials obtained in accordance with the invention are much better than would be expected from a consideration of the fastness of dyeings produced with the dyestuffs on materials for which they have direct affinity. This fastness to wet processing is particularly valuable in the case of materials subsequently to be subjected to discharge printing. Lack of fastness of the ground color to wet treatments in such cases frequently results in the pattern effects being stained by dye transferred from the unprinted to the printed portions.

The preparation of the cellulose ester or ether solution containing the dyestuff in suspension may be effected in various ways. For example the dyestuff may be finely milled and intimately mixed with the solution of the cellulose ester or ether. The milling is advantageously effected in the presence of a portion of the cellulose ester or ether solvent and with or without addition of a portion of the cellulose ester or ether. A particularly satisfactory way of reducing the dyestuff to the requisite fine state of dispersion is to work it, e. g. by kneading, rolling or the like, together with cellulose ester or ether and sufficient cellulose ester or ether solvent to form a dough, the mechanical treatment being continued while evaporating solvent until the product can be ground to powder. After grinding, the product can be incorporated with the requisite solvent and such further quantity of cellulose ester or ether as may be necessary.

Either wet or dry methods may be used for the setting of the cellulose ester or ether solutions containing the dispersed dyestuffs so as to produce filaments, films and the like; for instance filaments may be produced by spinning the solutions either into suitable evaporative atmospheres or into suitable coagulating baths.

Substantive cotton dyestuffs insoluble in the acetone or other solvent of filament- or film-forming solution or the like are suitable for the production of colored filaments, films and the like in accordance with the invention. However, substantive cotton dyestuffs modified to reduce their solubility in water, or other sulphonated dyestuffs insoluble in the solvent of the filament- or film-forming solution or the like, may be used. For example there may be used substantive cotton dyestuffs in the form of water-insoluble salts, e. g. barium or other alkaline earth metal salts, or polyazo dyes insoluble or difficultly soluble in water such as can be made by diazotising sulphonated diazotisable azo dyes, particularly substantive cotton dyes, and coupling with coupling components, e. g. phenol, $\beta$-naphthol, 2-naphthol-7-sulpho acid, 2:3-oxynaphthoic acid or an arylamide of the latter. If desired the modification of the dyestuff can be effected subsequently to the incorporation of the latter in the material. For instance filaments spun from a cellulose ester or ether solution having a substantive cotton dye suspended therein may be treated with an alkaline earth metal salt or with a salt of another metal which yields a difficultly soluble or insoluble salt with the dye.

Again, water-soluble dyestuffs containing chromium, iron, copper, nickel, or other heavy metals, particularly mordant metals, in complex combination, that is in a form from which the metal is not readily removed by the action of aqueous acids or alkalies can be used. Such dyestuffs containing metal in complex combination are chromium and other metal compounds of dyestuffs containing a sulphonic group and, in addition, in ortho- or peri-position to one another either two hydroxyl groups, or a hydroxyl group and an azo group, or a carboxyl group and an azo group, or a hydroxyl group and a carboxylic group.

The new process is especially useful when it is desired to produce materials having a grey or like neutral shade and particularly a shade of this kind which is dischargeable. For this purpose grey or black substantive cotton dyestuffs, particularly such as have been modified as described above, or grey or black metalliferous dyestuffs of the type described above are suitable when employed in an appropriate proportion. Such grey tinted materials can subsequently be colored in dark shades, for example navy blue, dark brown, bottle green or deep maroon, by applying thereto comparatively small proportions of dyes having direct affinity for the cellulose ester or ether. Dark shades which are dischargeable can be produced by suitable choice of the topping colors and of the grey or black dyestuff included in the filament-forming solution or the like. By these means a wide range of dark shades of excellent fastness to rubbing can be obtained very economically. On the other hand, as is well-known, the production of dark shades on cellulose ester or ether materials with direct dyeing dyestuffs almost invariably involves the use of very large proportions of dyestuff and is both costly and very liable to lead to shades of indifferent fastness to rubbing. It will be appreciated that it is not necessary to prepare a different grey material for every deep shade it is required to produce. A single grey tinted material can be colored in a very wide range of shades by the application of suitable direct dyeing topping colors and, as stated above, these will usually be required in comparatively small proportion.

The topping of the grey tinted cellulose ester or ether materials of the invention may be effected with various direct dyeing dyestuffs for cellulose esters or ethers, for example the water-insoluble dyestuffs of the nitro-diarylamine, azo, or amino anthraquinone series, such as are extensively employed for the coloration of cellulose acetate materials. The topping coloring matter may be applied either uniformly or locally according to the effects it is desired to produce. The topping colors may be applied, for instance, in aqueous solution or dispersion according to their nature, or in solution in organic solvents as described, for example, in U. S. Patents Nos. 1,738,978 and 1,927,145 and U. S. application S. No. 89,661 filed July 8, 1936.

The invention is of particular value in connection with the production of cellulose acetate filaments, foils and the like. It may, however, be applied in the production of filaments, foils and the like of other cellulose esters, for example cellulose formate, propionate or butyrate, or cellulose ethers, for example methyl, ethyl or benzyl cellulose. The grey or otherwise colored filaments may be converted into yarns or fabrics either alone or in association with other types of textile material, for example uncolored cellulose ester or ether filaments or regenerated cellulose, cotton, wool or silk. In the case of textile materials containing both the colored cellulose ester or ether filaments and other materials a wide range of color effects may be produced thereon by application of dyestuffs or mixtures of dyestuffs suitably selected according to the dyeing properties of the various components of the materials.

The invention is illustrated by the following examples:

Example 1

The direct cotton dyestuff Diazo Fast Green GFL is purified by first extracting with small quantities of cold water and then by extracting with hot methylated spirit. 1 part of the purified dyestuff is milled for several hours with ten times its weight of acetone, and is then further milled after addition of 0.5 part of cellulose acetate until the particle size has been reduced to that permissible in a spinning solution. Sufficient cellulose acetate and acetone are then added to yield a spinning solution containing about 0.5 part of the dyestuff and about 25% of cellulose acetate. This spinning solution is then spun into filaments by dry spinning methods. A greenish grey colored product is thus produced.

Example 2

Diazo Fast Green GFL, purified as described in Example 1, is dissolved in water, diazotised and coupled with an alkaline solution of β-naphthol. The precipitated dyestuff is filtered off and well washed, first with water and then with acetone. It is then well milled and used to prepare a spinning solution and filaments therefrom in the manner described in Example 1. A neutral grey colored product is obtained.

Example 3

Chlorazol Fast Grey 2BKS, Chlorazol Fast Grey 2GS or Diazo Fast Green GFL is purified by extracting first with cold water and then with hot methylated spirit. The purified dyestuff is dissolved in water and sufficient of an aqueous solution of barium chloride added to precipitate the barium salt of the dyestuff. The precipitated product is washed first with water and then with acetone, and is then milled and used to prepare a spinning solution and cellulose acetate filaments in the manner described in Example 1.

By topping the grey colored materials obtainable according to any of the above examples with direct dyeing dyes, a wide range of dark shades may be obtained. If the topping dyes are dischargeable then the resulting deep shades are also dischargeable. For example, dischargeable brown shades may be obtained by topping one of the grey materials prepared according to the above examples with the azo dyestuff from diazotised p-nitraniline and p-zylidine, or that from diazotised 3-nitro-4-amino-toluene and p-xylidine.

In the appended claims the expression "organic derivative of cellulose" is used to describe a cellulose ester of an organic carboxylic acid or a cellulose ether.

Having described my invention, what I desire to secure by Letters Patent is:

1. In the production of colored filaments, straws, foils and the like from a solution of an organic derivative of cellulose, the step of incorporating a water-insoluble salt of a sulphonated substantive cotton dyestuff, which is substantially without direct affinity for the cellulose derivative, with the preformed cellulose derivative and a solvent medium to form a spinning solution in which the said dyestuff is carried in suspension.

2. In the production of colored filaments, straws, foils and the like from a solution of cellulose acetate, the step of incorporating a water-insoluble salt of a sulphonated substantive cotton dyestuff, which is substantially without direct affinity for the cellulose acetate, with the preformed cellulose acetate and a solvent medium to form a spinning solution in which the said dyestuff is carried in suspension.

3. In the production of colored filaments, straws, foils and the like from a solution of an organic derivative of cellulose, the step of incorporating a barium salt of a sulphonated substantive cotton dyestuff, which is substantially without direct affinity for the cellulose derivative, with the preformed cellulose derivative and a solvent medium to form a spinning solution in which the said dyestuff is carried in suspension.

4. In the production of colored filaments, straws, foils and the like from a solution of cellulose acetate, the step of incorporating a barium salt of a sulphonated substantive cotton dyestuff, which is substantially without direct affinity for the cellulose acetate, with the preformed cellulose acetate and a solvent medium to form a spinning solution in which the said dyestuff is carried in suspension.

5. In the production of colored filaments, straws, foils and the like from a solution of an organic derivative of cellulose the step of incorporating a sulphonated substantive cotton dyestuff, which has been modified by diazotizing and coupling with a coupling component and is substantially without direct affinity for the cellulose derivative, with the preformed cellulose derivative and a solvent medium to form a spinning solution in which the said dyestuff is carried in suspension.

6. In the production of colored filaments, straws, foils and the like from a solution of cellulose acetate, the step of incorporating a sulphonated substantive cotton dyestuff, which has been modified by diazotizing and coupling with a coupling component and is substantially without direct affinity for the cellulose acetate, with the preformed cellulose acetate and a solvent medium to form a spinning solution in which the said dyestuff is carried in suspension.

7. Cellulose acetate filaments which have dispersed therein a water-insoluble salt of an acetone-insoluble sulphonated substantive cotton dyestuff which is substantially without direct affinity for cellulose acetate.

8. Cellulose acetate filaments which have dispersed therein coloring matter obtained by diazotizing a diazotizable sulphonated substantive cotton dyestuff and coupling it with a coupling component, said coloring matter being insoluble in acetone and substantially without direct affinity for cellulose acetate.

9. A spinning solution of an organic derivative of cellulose having suspended therein a sulphonated substantive cotton dyestuff which has been modified by treatment with an inorganic modifying agent comprising a metal compound so as to reduce its solubility in water.

10. A spinning solution of cellulose acetate having suspended therein a sulphonated substantive cotton dyestuff which has been modified by treatment with an inorganic modifying agent comprising a metal compound so as to reduce its solubility in water.

11. A spinning solution of an organic derivative of cellulose having suspended therein a water-insoluble salt of a sulphonated substantive cotton dyestuff.

12. A spinning solution of cellulose acetate having suspended therein a water-insoluble salt of a sulphonated substantive cotton dyestuff.

13. A spinning solution of an organic derivative of cellulose having suspended therein coloring matter obtained by diazotizing a diazotizable sulphonated substantive cotton dyestuff and coupling it with a coupling component.

14. A spinning solution of cellulose acetate having suspended therein coloring matter obtained by diazotizing a diazotizable sulphonated substantive cotton dyestuff and coupling it with a coupling component.

15. In the production of colored filaments, straws, foils and the like from a solution of an organic derivative of cellulose, the step of incorporating a dyestuff substantially without direct affinity for the cellulose derivative and comprising a sulphonated substantive cotton dyestuff which has been modified so as to reduce its solubility in water, with the preformed cellulose derivative and a solvent medium to form a spinning solution in which the said dyestuff is carried in suspension.

16. In the production of colored filaments, straws, foils and the like from a solution of an organic derivative of cellulose, the step of incorporating a sulphonated substantive cotton dyestuff the water-solubility of which has been reduced by treatment with an inorganic modifying agent comprising a metal compound, said dye derivative thus formed being substantially without direct affinity for the cellulose derivative, with the preformed cellulose derivative and a solvent medium to form a spinning solution in which the said dyestuff is carried in suspension.

17. In the production of colored filaments, straws, foils and the like from a solution of cellulose acetate, the step of incorporating a sulphonated substantive cotton dyestuff the water-solubility of which has been reduced by treatment with an inorganic modifying agent comprising a metal compound, said dye derivative thus formed being substantially without direct affinity for the cellulose acetate, with the preformed cellulose acetate and a solvent medium to form a spinning solution in which the said dyestuff is carried in suspension.

18. A spinning solution of an organic derivative of cellulose having suspended therein a sulphonated substantive cotton dyestuff the water-solubility of which has been reduced by treatment with an inorganic modifying agent comprising a metal compound, said dye derivative thus formed being substantially without direct affinity for the cellulose derivative.

HENRY DREYFUS.